C. F. BRECHT

PICTURE FRAME

Feb. 3, 1931. Re. 17,951

Original Filed Dec. 31, 1928

Inventor

CARL F. BRECHT,

By Schley & Trask

Attorneys

Reissued Feb. 3, 1931 Re. 17,951

UNITED STATES PATENT OFFICE

CARL F. BRECHT, OF INDIANAPOLIS, INDIANA, ASSIGNOR TO DEUBENER SHOPPING BAG, INC., OF INDIANAPOLIS, INDIANA

PICTURE FRAME

Original No. 1,759,432, dated May 20, 1930, Serial No. 329,352, filed December 31, 1928. Application for reissue filed August 23, 1930. Serial No. 477,453.

It is the object of my invention to provide a demountable picture-frame of sturdy, simple, and inexpensive construction, that will permit the ready insertion and removal of pictures, and that will provide a firm attachment for the backing (usually cardboard) which lies behind the picture proper and reinforces the frame.

In carrying out my invention, I provide a frame which is open along one edge, desirably along the bottom, and which in a rectangular frame has three other edges, desirably formed by two upright sides and a top; and removably mount the open edge of this frame by frictionally inserting the ends in a groove in a frame forming member which thus closes such open edge and which desirably also serves as a base to support the frame and picture. The inner edges of the sides and top of the frame proper are grooved to receive the cardboard backing, the picture, and the glass behind which the picture lies. The groove in the base is desirably slightly canted, so that at the back it is deeper than at the front; which permits the frame proper to slant slightly backward at the top, as is desirable in a standing picture-frame. Such canting, however, is insufficient to cause the projected center of gravity to fall outside of the base.

Heretofore, there has been difficulty in picture frames of this general type in that the carboard backing came loose very easily. This permitted relative movement between the sides and the top of the frame, because of the removal of the stiffening effect of the cardboard backing, and often resulted in the collapse of the frame.

To obviate this, I provide a more firm support for the cardboard backing. I desirably do this by two features in combination; although either may be used separately. These two features are:

1. The inward extension of the rear lip, against which the back of the cardboard backing lies, toward the center of the frame slightly beyond the lip at the front of the frame, to provide extra surface against which the back of the cardboard may be glued.

2. The provision of a sub-groove which receives the edge of only the cardboard backing, and thus supports the cardboard backing in front as well as behind.

Either or both of these features may be used; and in the preferred form of my invention both are used, particularly for relatively small size stock.

When larger stock is employed these features may be employed but such stock, as well as smaller stock, must provide a back face to the groove which is adequate for backing anchorage.

Figure 1:
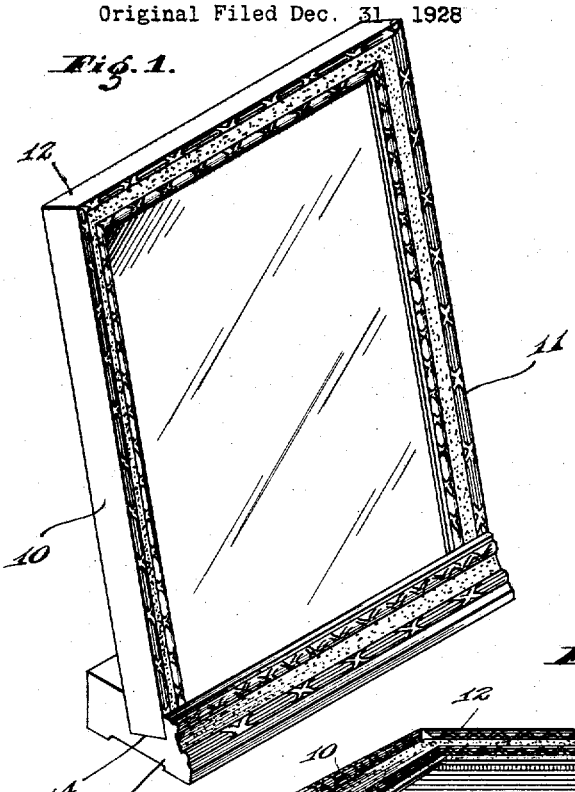
Figure 6:
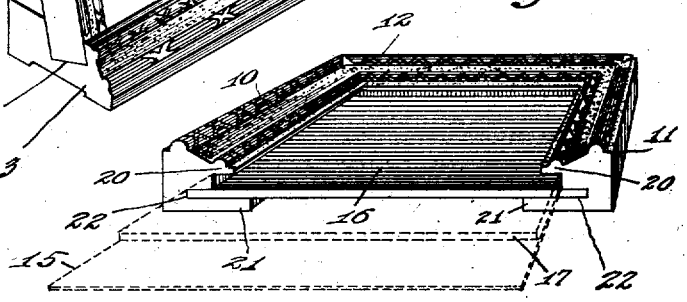
Figure 2:
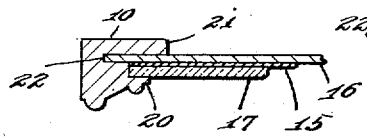

The accompanying drawing illustrates my invention: Fig. 1 is a perspective view of one form of picture frame constructed in accordance with my invention; Figs. 2, 3, 4, and 5 are fragmental cross-sectional details through the left upright, to show various modifications which my invention contemplates, Fig. 2 showing the preferred structure; and Fig. 6 is a fragmental perspective view, showing how the picture and glass are put into and taken out of place in the frame.

In the illustrative construction shown, the frame proper is rectangular, consisting of two side members 10 and 11 and a top member 12, so that these three members 10, 11, and 12 form approximately an inverted U. The lower end of this structure is not permanently closed; but is temporarily and preferably frictionally closed by a base member 13, which serves as a part of the frame and also serves as a support for the device as a whole. The base member 13 has a length at least equal to the width of the picture-frame; and a width, from front to back, sufficient to give stable support to the approximately upright frame. The base 13 for production purposes has a single groove 14 extending along it, and this groove 14 has its sides substantially perpendicular to its bottom although slightly canted so that the frame and picture slant slightly backward toward the top. The groove 14 is desirably of such width between its side walls that it provides a frictional grip on the lower ends of the side members 10 and 11 of the frame, to permit such side members to be inserted into and taken out of the groove fairly easily but yet to grip such side members sufficiently firmly so that they will not readily fall out.

The inner edges of the side members 10 and 11 and of the top 12 are grooved to receive the edges of a picture 15; the edges of a backing 16, which is usually of cardboard; and the edges of a glass 17, which lies in front of the picture 15 in the usual way with picture frames. The picture 15, and desirably the glass 17, may be slid into and out of the open or lower end of the frame 10—11—12, after first separating such frame from the base 13; but are retained in the frame by the base 13 when the base and frame proper are associated as shown in Fig. 1.

The backing 16, however, is glued or otherwise held in place adjacent the back face of each groove in and with relation to the side members 10 and 11 and the top 12, and the picture 15 and glass 17 are slidable into and out of place between such backing 16 and a front lip 20 which is provided on the side members 10 and 11 and desirably on the top member 12 to lie in front of the glass 17 at the side and top edges thereof. The lip 20 is spaced forward a sufficient distance from the front face of the backing 16 to permit this sliding of the picture and glass.

To hold the backing 16 firmly in place—for this backing has the important function of reinforcing the frame 10—11—12 as well as the function of providing a backing for the picture 15—I use for relatively small stock either or both of the two expedients already referred to; and desirably use both of them, as shown in Fig. 2. That is, I either provide a rear lip 21 which lies behind the backing 16 and projects farther inward toward the center of the picture than does the front lip 20, as is shown in Figs. 2, 5, and 6, to furnish extra surface against which the rear face of the backing 16 near its edge may be glued; or I provide a sub-groove 22 into which the edge of the backing 16 projects and which thus provides abutments against which the front face as well as the rear face of the backing may lie at its edges, as is shown in Figs. 2, 3, 4 and 6, such sub-groove 22 being deeper or extending farther toward the outer edges of the frame, permitting the backing 16 likewise so to extend, than do the edges of the picture 15 and glass 17 or both.

Figure 3:
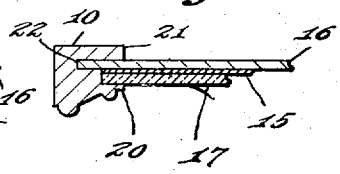
Figure 4:
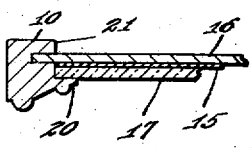
Figure 5:
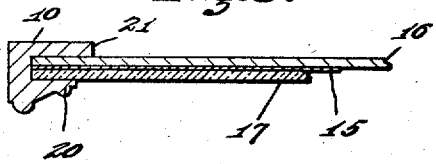

In the preferred form of my invention, as shown in Figs. 2 and 6, I use both the extended rear lip 21 and the sub-groove 22, although my invention contemplates embodiments which have only one of these features, as shown in Fig. 5 and in Figs. 3 and 4, as either one alone is of advantage. When the sub-groove 22 is used, the edges of the backing 16 at both the front and back surfaces near the edge are glued in place; and this forms a very firm support for the backing, because of the abutments which lie both directly behind and directly in front of it and thus resist pushing of the backing away from either of said abutments and the rupture of the glued joint. In all forms of the invention the area of the back face of the groove must be sufficient to provide adequate anchorage and generally such anchorage is sufficient if the groove extends to a depth of at least one-half the greatest corresponding dimension.

The extended lip 21 or the sub-groove 22, or both, are desirably provided on the top member 12 as well as on both side members 10 and 11 of the frame; although they are not so essential on the top member 12 as on the side members 10 and 11, because any tendency to rupture the joints between the backing and the wooden members of the frame usually starts at the free or lower edge of the frame.

While I have shown my invention with the member 13 serving as a supporting base as well as a closure for an open edge of the frame proper, because that is probably the most desirable construction, my invention is not limited to that feature save where especially stated in the claims.

I claim as my invention:

1. A frame for pictures, comprising two opposed frame members each having an inwardly projecting front lip behind which the edges of the glass, the picture, and the backing lie, and each also having an inwardly projecting back lip against which the rear face of the backing near its edges lies, said back lip extending farther inwardly than does the front lip; in combination with a backing which is fastened at its edges against such back lip to serve as a reinforcement between said two frame members and a closure member having a groove in which the ends of said opposed frame members are detachably mounted.

2. A frame for pictures, comprising two opposed frame members each having an inwardly projecting front lip behind which the edges of the glass, the picture, and the backing lie, and each also having an inwardly-opening sub-groove into which the edge of the backing projects so that abutments are provided for both the front and rear faces of the backing near its edges; in combination with a backing which is fastened at its edges in said sub-grooves, to serve as a reinforcement between said two frame members and a closure member having a groove in which the ends of said opposed frame members are detachably mounted.

3. A frame for pictures, comprising two opposed frame members each having an inwardly projecting front lip behind which the edges of the glass, the picture, and the backing lie, and each also having an inwardly projecting back lip against which the rear face of the backing near its edges lies, said back lip extending farther inwardly than does the front lip, each of said frame members also having an inwardly-opening sub-groove into which the edge of the backing projects so that abutments are provided for both the front and rear faces of the backing near its edges; in combination with a backing which is fastened at its edges against such back lip and in such sub-groove to serve as a reinforcement between said two frame members and a closure member having a groove in which the ends of said opposed frame members are detachably mounted.

4. A frame for pictures, comprising two side frame members, and a top frame member interconnecting the two side frame members, each of said three frame members having an inwardly projecting front lip behind which the edges of the glass, the picture, and the backing lie, and each also having an inwardly projecting back lip against which the rear face of the backing near its edges lies, said back lip extending farther inwardly than does the front lip; in combination with a backing which is fastened at its edges against such back lips, and a combined supporting base and closure member having in its top face a groove in which the lower ends of the two side frame members are detachably mounted.

5. A frame for pictures, comprising two side frame members and a top frame member interconnecting the two side frame members, each of said three frame members having an inwardly projecting front lip behind which the edges of the glass, the picture, and the backing lie, and each also having an inwardly-opening sub-groove into which the edge of the backing projects so that abutments are provided for both the front and rear faces of the backing near its edges; in combination with a backing which is fastened at its edges in said sub-grooves, and a combined supporting base and closure member having in its top face a groove in which the lower ends of the two side frame members are detachably mounted.

6. A frame for pictures, comprising two side frame members and a top frame member interconnecting the two side frame members, each of said three frame members having an inwardly projecting front lip behind which the edges of the glass, the picture, and the backing lie, and each also having an inwardly projecting back lip against which the rear face of the backing near its edges lies, said back lip extending farther inwardly than does the front lip, each of said frame members also having an inwardly-opening sub-groove into which the edge of the backing projects so that abutments are provided for both the front and rear faces of the backing near its edges; in combination with a backing which is fastened at its edges against such back lip and in such sub-groove, and a combined supporting base and closure member having in its top face a groove in which the lower ends of two side frame members are detachably mounted.

7. A frame for pictures comprising two opposed frame members, each having an inwardly projecting front lip, back of which the edges of the picture and the backing may lie and each having an inwardly projecting back lip against and in front of which the rear face of the backing near its edges lies, the amount of lap between the back lip and the backing being sufficient to provide an anchorage for the backing to which it is adhesively secured to prevent buckling or separation from the frame members and to serve as a reinforcement between said frame members, and a frame completing closure member having a groove in which the ends of said opposed frame members are detachably mounted.

8. A frame for pictures comprising two opposed frame members, each having an inwardly projecting front lip, back of which the edges of the picture and the backing may lie and each having an inwardly projecting back lip against and in front of which the rear face of the backing near its edges lies, the amount of lap between the back lip and the backing being sufficient to provide an anchorage for the backing to which it is adhesively secured to prevent buckling or separation from the frame members, and to serve as a reinforcement between said frame members, and a frame completing closure member having a groove extending longitudinally across the upper face thereof and of a length equal to the width of the spacing between the opposed frame members and said members and frictionally receiving the ends of said frame members for detachable mounting therebetween.

9. A frame for pictures comprising two opposed frame members, each having an inwardly projecting front lip, back of which the edges of the picture and the backing may lie and each having an inwardly projecting back lip against and in front of which the rear face of the backing near its edges lies, the amount of lap between the back lip and the backing being sufficient to provide an anchorage for the backing to which it is adhesively secured to prevent buckling or separation from the frame members, and to serve as a reinforcement between said frame members, and a combined supporting base and frame completing closure member having in its top face a longitudinal groove near the forward edge thereof, in which the lower ends of the two frame members are detachably mounted, the projected center of gravity of the frame when associated with the closure and frame forming member falling within the outline of the base.

10. A picture construction including a picture frame having a central opening and defined by a bottom open end and a peripheral frame other than at the end, a combination peripheral frame and base member longitudinally grooved near its forward portion and arranged to receive the open side of the frame structure for closing the same and completing the picture frame and simultaneously retaining the picture, a transparent closure, and a backing within the open sided frame and in completely enclosed relation when supported in inclined relation.

11. A frame for pictures comprising two opposed members, each having an inwardly directed groove therein, the rear face of each groove being of a width at least equal to half of the overall width of the greatest corresponding dimension, whereby sufficient anchoring area is provided, a backing adhesively secured at its edges to said anchorage area, a glass loosely mounted in the groove, the width of said grooves being sufficient for the detachable reception of a picture between backing and the glass, and a frame completing closure member having a groove in which the ends of said opposed frame members are detachably mounted, said backing serving as a reinforcement between two first mentioned frame members.

12. A frame for pictures comprising two opposed frame members, each having an inwardly projecting front lip, back of which the edges of the picture and the backing may lie and each having an inwardly projecting back lip against and in front of which the rear face of the backing near its edges lies, the amount of lap between the back lip and the backing being sufficient to provide an anchorage for the strip to which it is adhesively secured to prevent buckling or separation from the frame members, and to serve as a reinforcement between said frame members, and a combined supporting base and frame completing closure member having in its top face a longitudinal groove near the forward edge thereof, in which the lower ends of the two frame members are detachably mounted, the projected center of gravity of the frame when associated with the closure and frame forming member falling within the outline of the base, the closure member groove being inclined forwardly for pitching the frame rearwardly and upwardly, whereby the projected center of gravity is behind the forward edge of the base and said base extends an appreciable distance rearwardly of the bottom ends of the frame members providing firm foundation for a standing frame.

In witness whereof, I have hereunto affixed my signature.

CARL F. BRECHT.